(12) United States Patent
Glasco et al.

(10) Patent No.: US 8,244,984 B1
(45) Date of Patent: *Aug. 14, 2012

(54) SYSTEM AND METHOD FOR CLEANING DIRTY DATA IN AN INTERMEDIATE CACHE USING A DATA CLASS DEPENDENT EVICTION POLICY

(75) Inventors: David B. Glasco, Austin, TX (US);
Peter B. Holmqvist, Cary, NC (US);
George R. Lynch, Raleigh, NC (US);
Patrick R. Marchand, Apex, NC (US);
James Roberts, Austin, TX (US); John Edmondson, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 12/330,467

(22) Filed: Dec. 8, 2008

(51) Int. Cl.
*G06F 13/00* (2006.01)
*G06F 12/12* (2006.01)

(52) U.S. Cl. .......................... 711/133; 711/135; 711/143

(58) Field of Classification Search .................. 711/133, 711/134, 135, 143
See application file for complete search history.

(56) References Cited

U.S. PATENT DOCUMENTS

| | | | | |
|---|---|---|---|---|
| 5,542,066 A | * | 7/1996 | Mattson et al. | 711/136 |
| 5,544,306 A | * | 8/1996 | Deering et al. | 345/545 |
| 5,579,473 A | * | 11/1996 | Schlapp et al. | 345/557 |
| 5,895,488 A | * | 4/1999 | Loechel | 711/135 |
| 6,119,205 A | * | 9/2000 | Wicki et al. | 711/143 |
| 6,327,643 B1 | * | 12/2001 | Egan | 711/134 |
| 6,535,966 B1 | * | 3/2003 | Cherabuddi et al. | 711/154 |
| 6,591,347 B2 | * | 7/2003 | Tischler et al. | 711/134 |
| 6,922,754 B2 | * | 7/2005 | Liu et al. | 711/138 |
| 2003/0084248 A1 | * | 5/2003 | Gaither et al. | 711/133 |
| 2009/0204765 A1 | * | 8/2009 | Gupta et al. | 711/133 |

* cited by examiner

*Primary Examiner* — Sanjiv Shah
*Assistant Examiner* — Glenn Gossage
(74) *Attorney, Agent, or Firm* — Patterson & Sheridan, LLP

(57) ABSTRACT

In one embodiment, a method for managing information related to dirty data stored in an intermediate cache coupled to one or more clients and to an external memory includes receiving a dirty data notification related to dirty data residing in the intermediate cache, the dirty data notification including a memory address indicating a location in the external memory where the dirty data should be stored and a data type associated with the dirty data, and extracting a bank page number from the memory address that identifies a bank page within the external memory where the dirty data should be stored. The embodiment also includes incrementing a first count associated with a first entry in a notification sorter that is affirmatively associated with the bank page, determining that the dirty data has a first data type, and incrementing a second count associated with the first entry.

21 Claims, 10 Drawing Sheets

SYSTEM AND METHOD FOR CLEANING DIRTY DATA IN AN INTERMEDIATE CACHE USING A DATA CLASS DEPENDENT EVICTION POLICY

BACKGROUND OF THE INVENTION

1. Field of the Invention

The present invention relates generally to the field of memory management and, more specifically, to class dependent clean and dirty policy.

2. Description of the Related Art

One element of a memory subsystem within certain processing units is a Level 2 Cache memory (referred to herein as "L2 cache"). The L2 cache is a large on-chip memory that serves as an intermediate point between an external memory (e.g., frame buffer memory) and internal clients of the memory subsystem (referred to herein as the "clients"). The L2 cache temporarily stores data being used by the various clients. This data may be retrieved from or written to an external memory (referred to herein as a dynamic random access memory or "DRAM"). The clients may re-use data that is stored in the L2 cache while performing certain operations.

During a write operation, where a client transmits data that needs to be committed to a DRAM, the data to be written is first transmitted to the L2 cache and is held there until an opportune time to push the data to the DRAM arises. Data present in the data cache is considered "dirty" until the data is written to the DRAM, after which the memory space in the data cache can be cleaned and made available for other data. During a read operation, a client may request data that was previously written during a write operation. If that data is not currently stored in the L2 cache then that data has to be retrieved from the DRAM. A read operation where the data has to be retrieved from the DRAM is processed in significantly more clock cycles than a read operation where the data is retrieved directly from the L2 cache. Thus, overall system performance may be severely impacted if data has to be retrieved from the DRAM for a significant number of read operations.

As is well known, each block of dirty data in the L2 cache has an associated location within a specific bank page of the DRAM, where the dirty data is written. To optimize memory accesses by mitigating delays resulting from waiting for DRAM bank pages to pre-charge, the number of write operations from the L2 cache to a particular DRAM bank page at any given time should be maximized. However, simply maximizing the number of write operations to the DRAM bank page may not strike the appropriate balance of optimizing write operations to the DRAM and allowing data to remain in the L2 cache long enough to be reused so that data requests to the DRAM can be avoided.

As the foregoing illustrates, what is needed in the art is a more efficient mechanism for determining which data should be transmitted from an intermediate cache, such as an L2 cache, to an external memory.

SUMMARY OF THE INVENTION

One embodiment of the present invention sets forth a method for cleaning dirty data stored in an intermediate cache coupled to one or more clients and to an external memory. The method includes the steps of receiving a dirty data notification related to dirty data residing in the intermediate cache, where the dirty data notification includes a memory address indicating a location in the external memory where the dirty data should be stored and a data type associated with the dirty data, extracting a bank page number from the memory address that identifies a bank page within the external memory where the dirty data should be stored, and incrementing a first count associated with a first entry in a notification sorter that is affirmatively associated with the bank page.

One advantage of the disclosed method is that it enables the entry having the highest count of cache lines with dirty data and the highest count of cache lines with dirty data belonging to evict_first data class to be selected when dirty data residing in the intermediate cache is cleaned. This approach ensures that the cache lines with dirty data belonging to the evict_first data class are cleaned at a higher priority than dirty data belonging to other data classes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it should be apparent to one of ordinary skill in the art that the present invention may be practiced without one or more of these specific details. In other instances, well-known features have not been described in order to avoid obscuring the present invention.

System Overview

Figure 1:
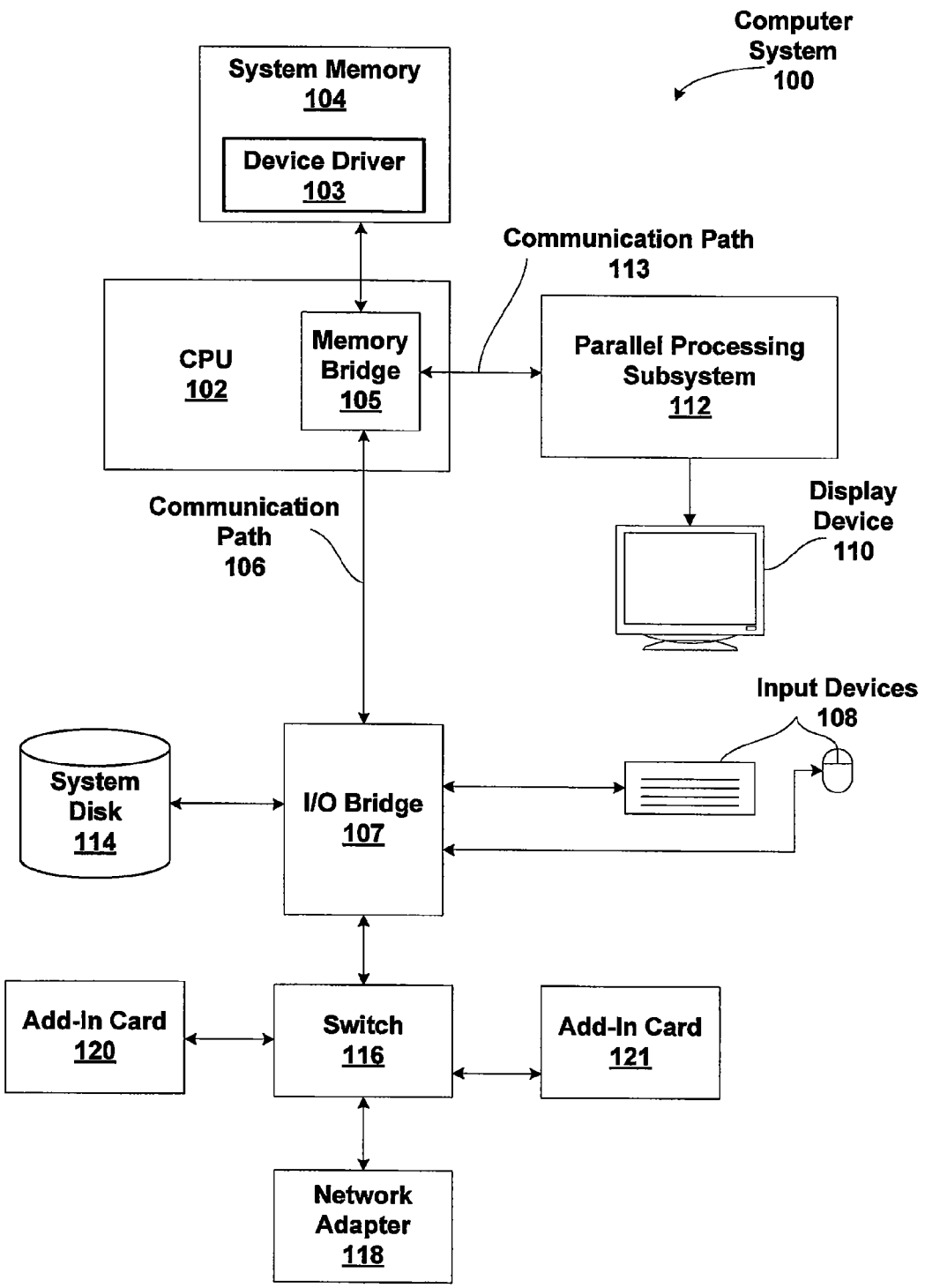
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
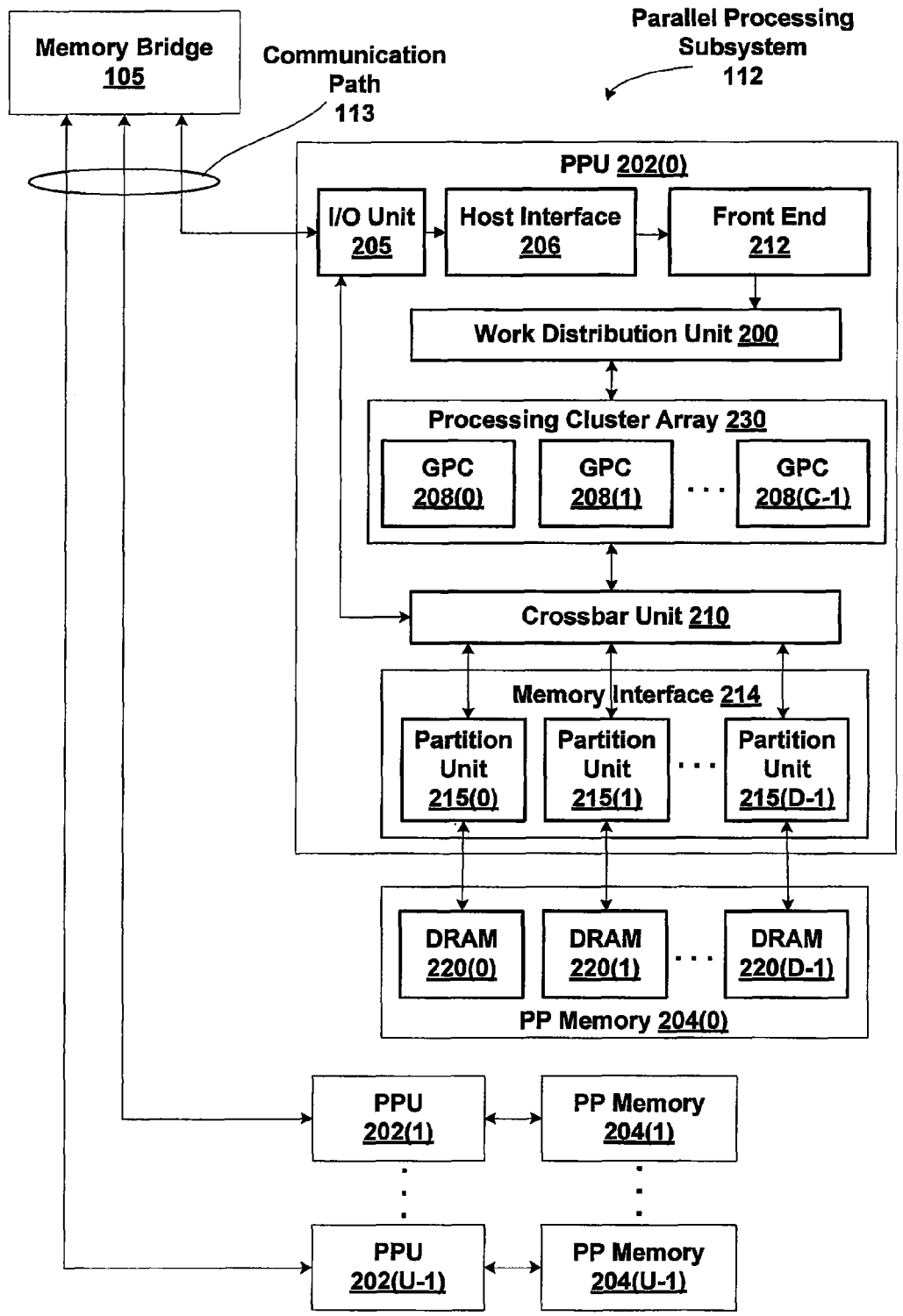
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of the PPUs 202.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≧1. Each portion of parallel processing memory 204 generally includes one or more memory devices (e.g DRAM 220). Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
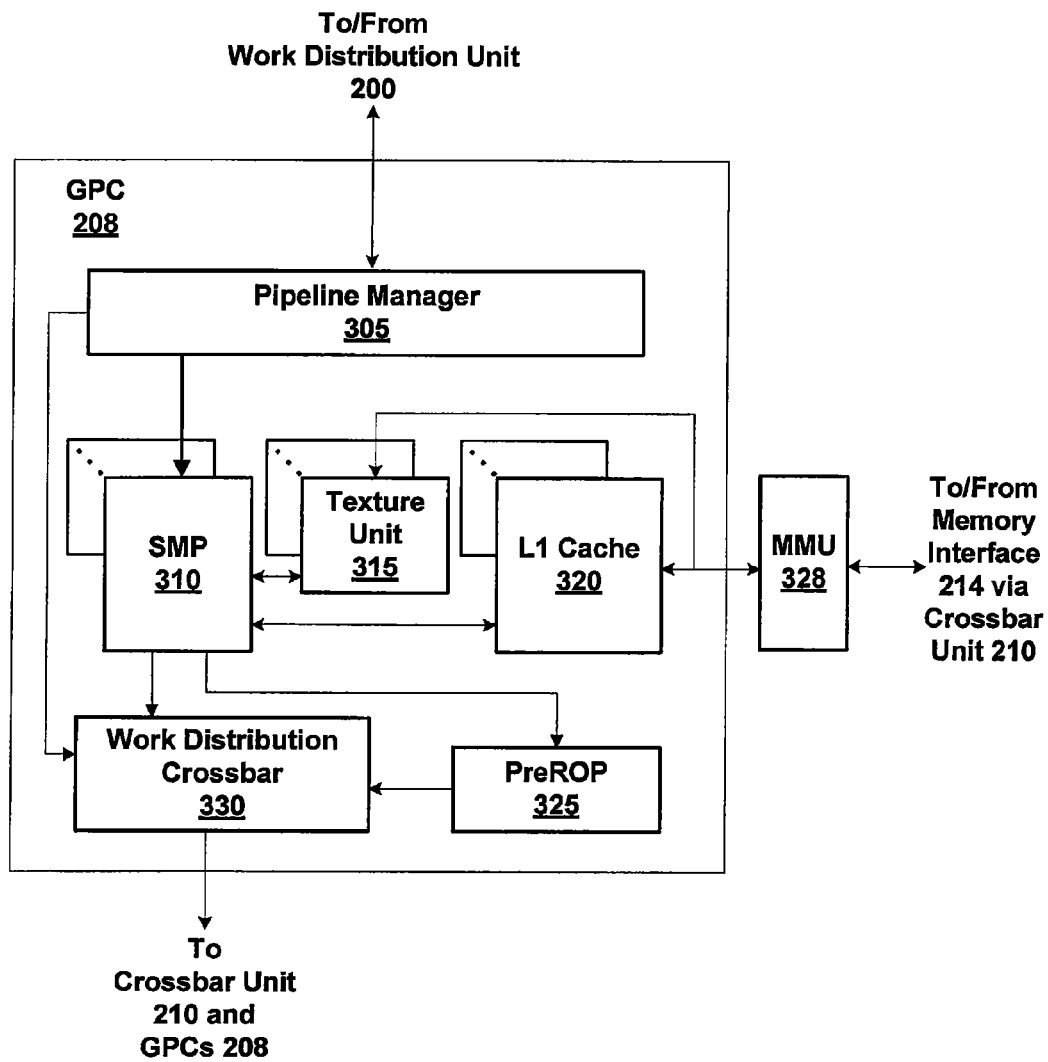
FIG. 3A is a block diagram of a general processing cluster (GPC) within one of the parallel processing units (PPUs) of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Referring now to FIGS. 2 and 3A, in graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SMPs) 310. Pipeline manager 305 may also be configured to control a work distribution crossbar 330 by specifying destinations for processed data output by SMPs 310.

In one embodiment, each GPC 208 includes a number M of SMPs 310, where M≧1, each SMP 310 configured to process one or more thread groups. Also, each SMP 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SMP 310 is referred to herein as a "thread group." As used herein, a "thread group" refers to a group of threads concurrently executing the same program on different input data, with each thread of the group being assigned to a different processing engine within an SMP 310. A thread group may include fewer threads than the number of processing engines within the SMP 310, in which case some processing engines will be idle during cycles when that thread group is being processed. A thread group may also include more threads than the number of processing engines within the SMP 310, in which case processing will take place over multiple clock cycles. Since each SMP 310 can support up to G thread groups concurrently, it follows that up to G×M thread groups can be executing in GPC 208 at any given time.

An exclusive local address space is available to each thread, and a shared per co-operative thread array (CTA) address space is used to pass data between threads within a CTA. Data stored in the per-thread local address space and per-CTA address space is stored in L1 cache 320, and an eviction policy may be used to favor keeping the data in L1 cache 320. Each SMP 310 uses space in a corresponding L1 cache 320 that is used to perform load and store operations. Each SMP 310 also has access to L2 caches within the partition units 215 that are shared among all GPCs 208 and may be used to transfer data between threads. Finally, SMPs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SMP 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SMP 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SMP 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines (not shown) SMPs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
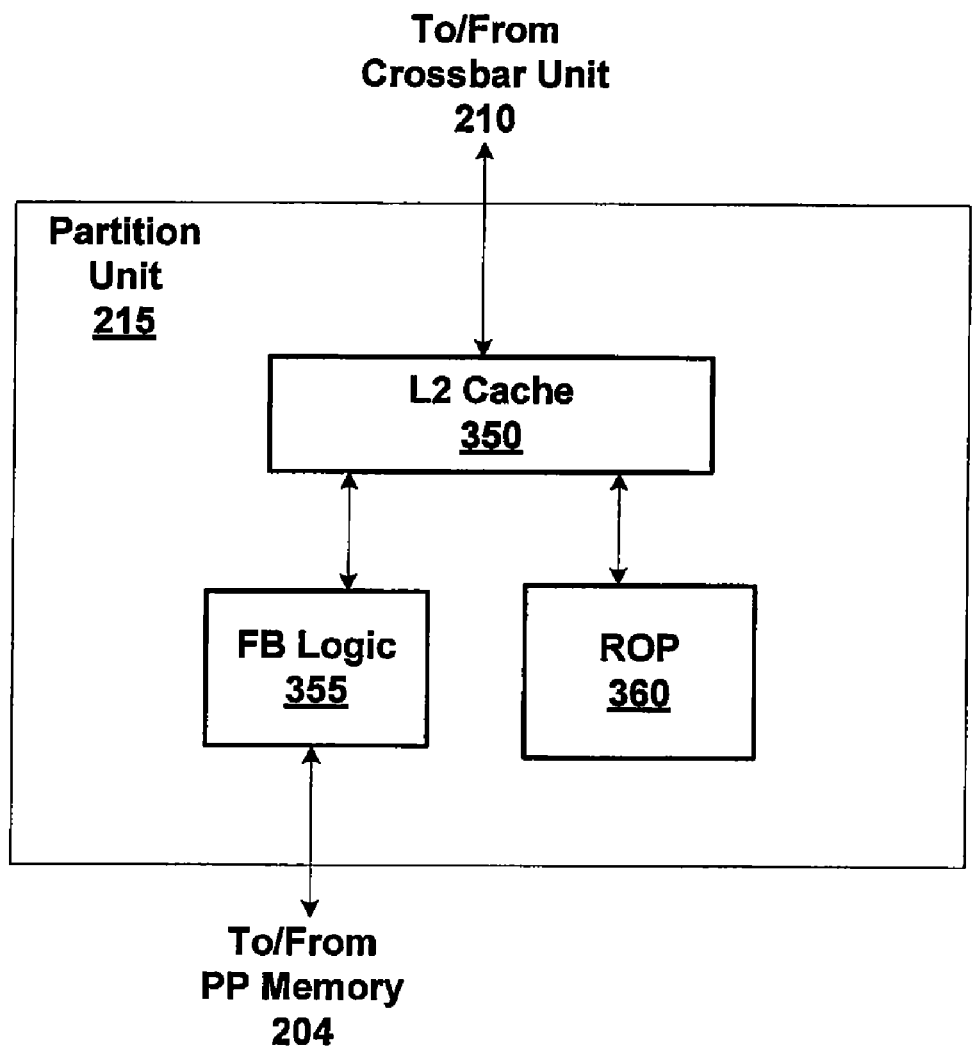
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) logic 355, and a raster operations unit (ROP) 360. L2 cache 350 is a read/write cache that is configured to perform load and store operations received from crossbar unit 210 and ROP 360. Read misses and urgent writeback requests are output by L2 cache 350 to frame buffer logic 355 for processing. Dirty updates are also sent to frame buffer logic 355 for opportunistic processing. Frame buffer logic 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

Referring also to FIG. 1, the processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons of ordinary skill in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing from the scope of the present invention.

Data Class Based Eviction Policies

Figure 4:
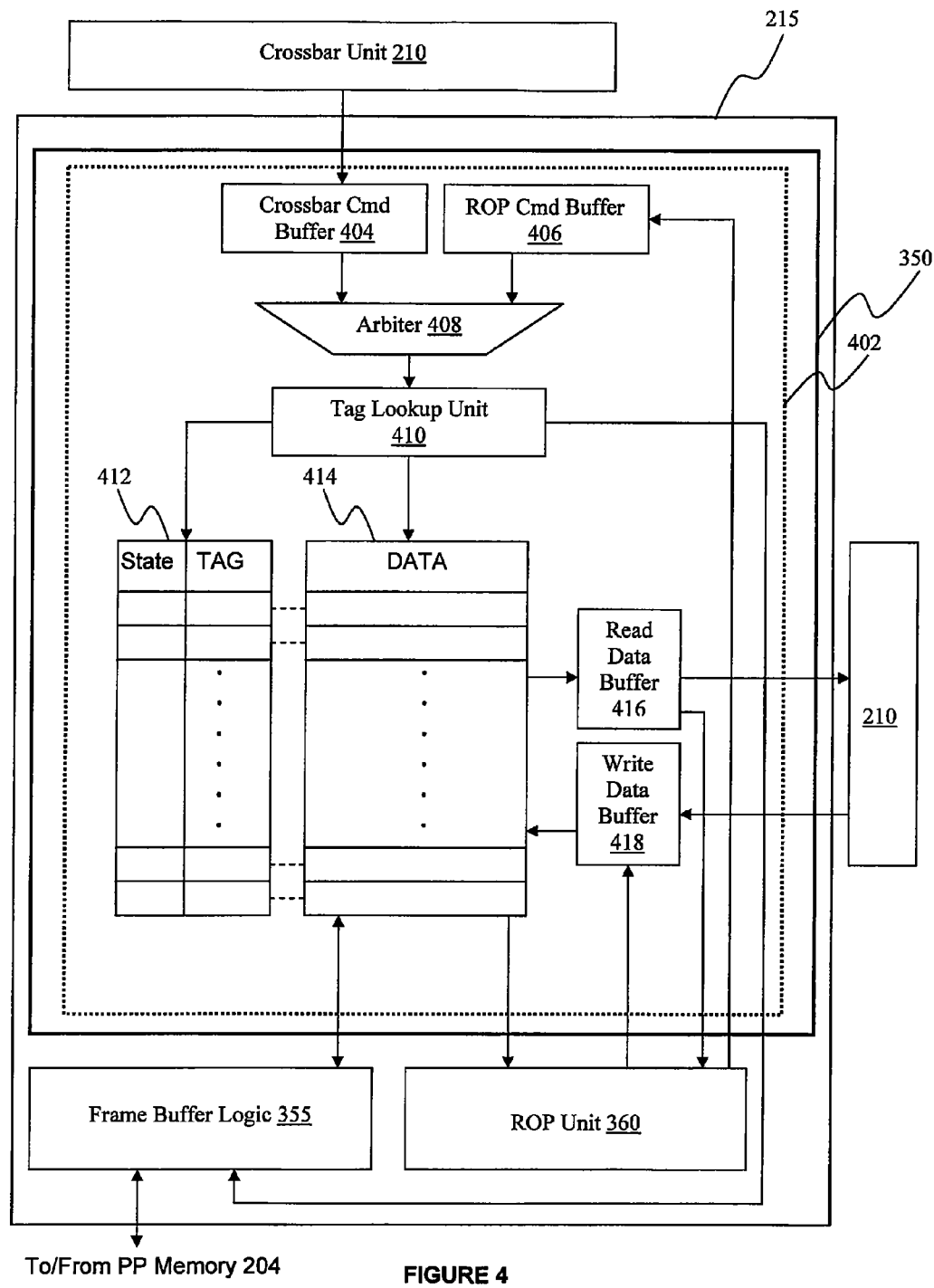
FIG. 4 is a detailed block diagram of the partition unit of FIG. 3B, according to one embodiment of the present invention.

FIG. 4 is a detailed block diagram of the partition unit 215 of FIG. 3B, according to one embodiment of the present invention. As shown, the partition unit 215 includes the L2 cache 350, the frame buffer logic 355 and the ROP 360. The L2 cache 350 includes an L2 cache slice 402. As described in conjunction with FIG. 3B, the L2 cache 350 may be split into two or more slices for more efficient processing of read and write commands. The L2 cache slice 402 is one such slice of the L2 cache 350. The L2 cache slice 402 includes a crossbar command buffer 404, a ROP command buffer 406, an arbiter 408, a tag look-up unit 410, a tag store 412, a data cache 414, a read data buffer 416 and a write data buffer 418.

In operation, the L2 cache slice 402 receives read and write commands from various clients within the parallel processing subsystem 112, such as the GPCs 208 and the ROP 360. Read and write commands received from the GPCs 208 are transmitted via the crossbar unit 210. In the case of write commands, the data associated with the write command is also transmitted to the L2 cache slice 402.

Each read or write command received by the L2 cache slice 402 includes a memory address associated with a set of cache lines within the data cache 414, where the data associated with the read or write command may be stored. In one embodiment, the data cache 414 is a physically-indexed and tagged 64 kilobyte (KB) set associative data cache. The data cache 414 is divided into four segments, where each segment has thirty-two rows and each row having sixteen cache lines of 32 bytes (B). A cache line is a physical location within the data cache 414 where data associated with read and write commands is stored. At any given clock cycle, a cache line in the data cache 414 may be empty, may include resident data, or may be reserved for a command that is in progress. In one embodiment of the present invention, due to the size of the data associated with a command, multiple cache lines may need to be reserved to store the data associated with the command. The techniques described herein can be easily extended to data that should be stored in multiple cache lines.

A read or write command received by the L2 cache slice 402 also includes the data class of the data associated with the received command. The data class of the data associated with a command is determined by the client transmitting the particular command and, as described in greater detail herein, reflects the reuse potential of that data within the parallel processing subsystem 112.

The crossbar command buffer 404 is coupled to the crossbar unit 210 and is configured to receive read and write commands from the different GPCs 208 via the crossbar unit 210. The ROP command buffer 406 is coupled to the ROP 360 and is configured to receive read and write commands from the ROP 360. The crossbar command buffer 404 and ROP command buffer 406 are FIFO (first-in-first-out) buffers, that is, the commands received by the command buffers are output in the order the commands are received from the crossbar unit 210 or the ROP 360. The crossbar command buffer 404 and the ROP command buffer 406 are also coupled to the arbiter 408. The arbiter 408 is configured to use standard arbitration techniques to select a given command from the crossbar command buffer 404 or the ROP command buffer 406 and transmit the selected command to the tag look-up unit 410 for processing.

The tag look-up unit 410 is configured to determine whether there is cache line availability in the data cache 414 for the data associated with a command received from the arbiter 408. The tag look-up unit 410 is also configured, where possible, to make cache lines available for data associated with a newly received read or write command by causing data resident in the data cache 414 to be evicted. Once one or more cache lines in the data cache 414 are available for such data, the tag look-up unit 410 is configured to reserve an identified cache line in the data cache 414 for the data associated with the command.

Each cache line in the data cache 414 has a corresponding entry in the tag store 412, and each entry in the tag store includes a line state, which includes a valid bit, a pinned bit and a dirty bit, and a tag portion. When set, the full bit indicates that the line holds the data pointed to by the tag, the dirty bit indicates that the data is dirty and the pinned bit indicates that the data is in use and cannot be evicted. The tag portion of an entry includes the data class of the data stored within the cache line associated with that particular entry and the tag portion of the memory address. As previously indicated herein, the cache semantics of the L2 cache 350 are extended to include three data classes: evict_first, evict_normal and evict_last. Data stored within a cache line in the data cache 414 belonging to the evict_first data class typically has little or no reuse potential by any of the clients using the L2 cache 350. Because of the low likelihood of reuse this data can be evicted quickly from the data cache 414 to make room for other data without a high risk of causing subsequent cache misses. In one embodiment, data belonging to the evict_first data class may be raster operations data received from the ROP 360. Raster operations data has little reuse potential and can be evicted from the data cache 414 very quickly. Data stored within a cache line in the data cache 414 belonging to the evict_normal data class typically has some reuse potential by the clients using the L2 cache 350. Because of the reuse potential, this data may be evicted at a lower priority than data belonging to the evict_first data class without causing a significant number of subsequent cache misses. Data stored within a cache line in the data cache 414 belonging to the evict_last data class typically has a high reuse potential by the clients using the L2 cache 350. Because of the high likelihood of reuse this data should not be evicted from the data cache 414 to make room for other data as this would result in a high risk of subsequent cache misses. In other embodiments, the L2 cache 350 semantics may be extended to include other data classes based on the requirements of the parallel processing subsystem 112.

Data stored in a cache line is also categorized as "clean" or "dirty," and "pinned" or "unpinned." Stored data is deemed to be clean if the data is coherent with the corresponding data in parallel processing memory 204. Stored data is deemed to be dirty if the data is not coherent with the corresponding data in parallel processing memory 204. As is well known, dirty data should be cleaned prior to being evicted. Unpinned data constitutes data stored in a cache line of data cache 414 that is not currently being used. Pinned data constitutes data stored in a cache line of the data cache 414 that is currently being used by the L2 cache 350. Because pinned data is in use, this data should not be evicted. The dirty and pinned bit portions of an entry in the tag store 412 that is associated with a cache line in the data cache 414 that has resident dirty data or resident pinned data are set respectively.

In the case of read commands, the read data buffer 416 is configured to store data associated with a processed read command received from the data cache 414 until that data is transmitted back to the GPCs 208, via the crossbar unit 210, or the ROP 360, as the case may be. In the case of write commands, the write data buffer 418 is configured to store data associated with a write command received from the GPCs 208, via the crossbar unit 210, or the ROP 360, as the case may be, until that data is transmitted to a corresponding reserved cache line in the data cache 414.

As previously indicated herein, upon receiving a command from the arbiter 408, the tag look-up unit 410 is configured to identify a set of cache lines within the data cache 414 in which the data associated with the received command may potentially be stored. This set of cache lines, referred to herein as the "identified cache lines," is determined based on the memory address included in the read or write command using standard set-associative caching techniques (the memory address indicates the actual location within the parallel processing memory 204 from where the data is read or to where the data is ultimately written). In the case of a read command, the tag look-up unit 410 next determines whether the data associated with the command is currently residing within one of the identified cache lines. If so, meaning that there is a cache hit, then the tag look-up unit 410 causes the requested data to be transmitted from the data cache 414 to the read data buffer 416, where the data is stored until the data is returned to the requesting client. In the case of a write command, the tag look-up unit 410 first determines whether the data associated with the command can be written over data currently residing within one of the identified cache lines. If so, again meaning that there is a cache hit, then the tag look-up unit 410 causes the data associated with the command that is stored in the write data buffer 418 to be written to the associated location of the data cache 414.

In the case of a cache miss, meaning that the data associated with the command is not resident in (in the case of a read command) or cannot be written to (in the case of a write command) one of the identified cache lines, then the tag look-up unit 410 determines whether one of the identified cache lines is empty. If one of the identified cache lines is empty, then the tag look-up unit 410 reserves the empty cache line for the data associated with the read or write command. If none of the identified cache lines is empty, then the tag look-up unit 410 implements a series of cache eviction policies based on the data classes of the data resident in the identified cache lines.

The tag look-up 410 unit first examines the entries in the tag store 412 associated with each of the identified cache lines to determine whether any of the cache lines have resident data that is clean, unpinned and evict_first. The dirty bit and in use bit should not be set. The tag portion of such an entry should indicate that the data stored in the relevant cache line belongs to the evict_first data class. If any such cache lines exist, then the tag look-up unit 410 causes the least recently used clean, unpinned and evict_first data to be evicted from the data cache 414. After evicting the data, the tag look-up unit 410 reserves the resulting empty cache line for the data associated with the command.

If none of the data residing in the identified cache lines is clean, unpinned and evict_first, then the tag look-up 410 examines the entries in the tag store 412 associated with each of the identified cache lines to determine whether any of the cache lines that have resident data that is clean, unpinned and evict_normal. The dirty and in-use bits of an entry in the tag store 412 associated with any cache line having resident data that is clean, unpinned and evict_normal should not be set, and the tag portion of such an entry should indicate that the data stored in the relevant cache line belongs to the evict_normal data class. If any such cache lines exist, then the tag look-up unit 410 causes the least recently used clean, unpinned and evict_normal data to be evicted from the data cache 414. After evicting the data, the tag look-up unit 410 reserves the resulting empty cache line for the data associated with the command.

In one embodiment, if none of the data residing in the identified cache lines is clean, unpinned and evict_first data or clean, unpinned and evict_normal data, then the command is stalled until the data residing in one of the identified cache lines can be evicted from the data cache 414.

In an alternative embodiment, if none of the data residing in the identified cache lines is clean, unpinned and evict_first data or clean, unpinned and evict_normal data, then the tag look-up unit 410 determines whether the data associated with the command belongs to the evict_last data class. If the data associated with the command does not belong to the evict_last data class, then the command is stalled until the data residing in one of the identified cache lines can be evicted from the data cache 414. However, if the data associated with the command belongs to the evict_last data class, then the tag look-up 410 examines the entries in the tag store 412 associated with each of the identified cache lines to determine whether one of the cache lines has resident data that is clean, unpinned and evict_last. The dirty and in use bits of an entry in the tag store 412 associated with any cache line having resident data that is clean, unpinned and evict_last should not be set, and the tag portion of such an entry should indicate that the data stored in the relevant cache line belongs to the evict_last data class. If any such cache lines exist, then the tag look-up unit 410 updates the tag portion associated with the cache line to replace the evict_last data class with the evict_normal data class. By changing the data class of the data residing in the relevant cache line, the tag look-up unit 410 is then able to evict that resident data based on the cache eviction policies set forth above. The tag look-up unit 410 then causes the least recently used clean, unpinned, evict_normal data to be evicted from the data cache 414. After evicting the evict_normal data, the tag look-up unit 410 reserves the empty cache line for the data associated with the command, as previously described herein.

To reserve a cache line for the data associated with a command, the tag look-up unit 410 sets the in use bit portion within the entry associated with the cache line being reserved. The tag look-up unit 410 then updates the tag portion within the entry associated with the cache line being reserved to reflect the data class of the data associated with the command and the memory address of the line. Once the appropriate cache line is reserved, for a read command, the tag look-up unit 410 transmits a data request to the frame buffer logic 355 for the data associated with the read command. The frame buffer logic 355 transmits the data associated with the read command to the reserved cache line at a future clock cycle. For a write command, the data associated with the write command is transmitted from the write data buffer 418 and stored in the reserved cache line. The tag look-up unit 410 then determines whether the data associated with the write command also should be stored in the parallel processing memory 204 based on the data class of the data. If the data should be stored in the parallel processing memory 204, then the tag look-up unit 410 transmits a dirty data notification to the frame buffer logic 355. A dirty data notification includes the memory address and the data class included in the write command associated with the data stored in the reserved cache line.

In certain embodiments, read commands may be transmitted to the L2 cache slice 402 by the clients within the parallel processing subsystem 112 where the data associated with those commands is retrieved from system memory 104 or a memory associated with another GPU (or PPU) within the computer system 100 and stored temporarily in the data cache 414, as opposed to being retrieved from the parallel processing memory 204 coupled to frame buffer logic 355, as previously described herein. Similarly, in certain embodiments, write commands may be transmitted to the L2 cache slice 402 by the GPCs 208 or the ROP 360 where the data associated with those commands is temporarily stored in the data cache 414 before being written to system memory 104 or a memory associated with another GPU (or PPU) within the computer system 100, as opposed to being written to the parallel processing memory 204 coupled to frame buffer logic 355, as previously described herein. In all such embodiments, the manner in which the data associated with the read or write commands is cached in and evicted from the data cache 414, as described herein, remains unchanged. Thus, all such embodiments fall within the scope of the present invention.

Figure 5:
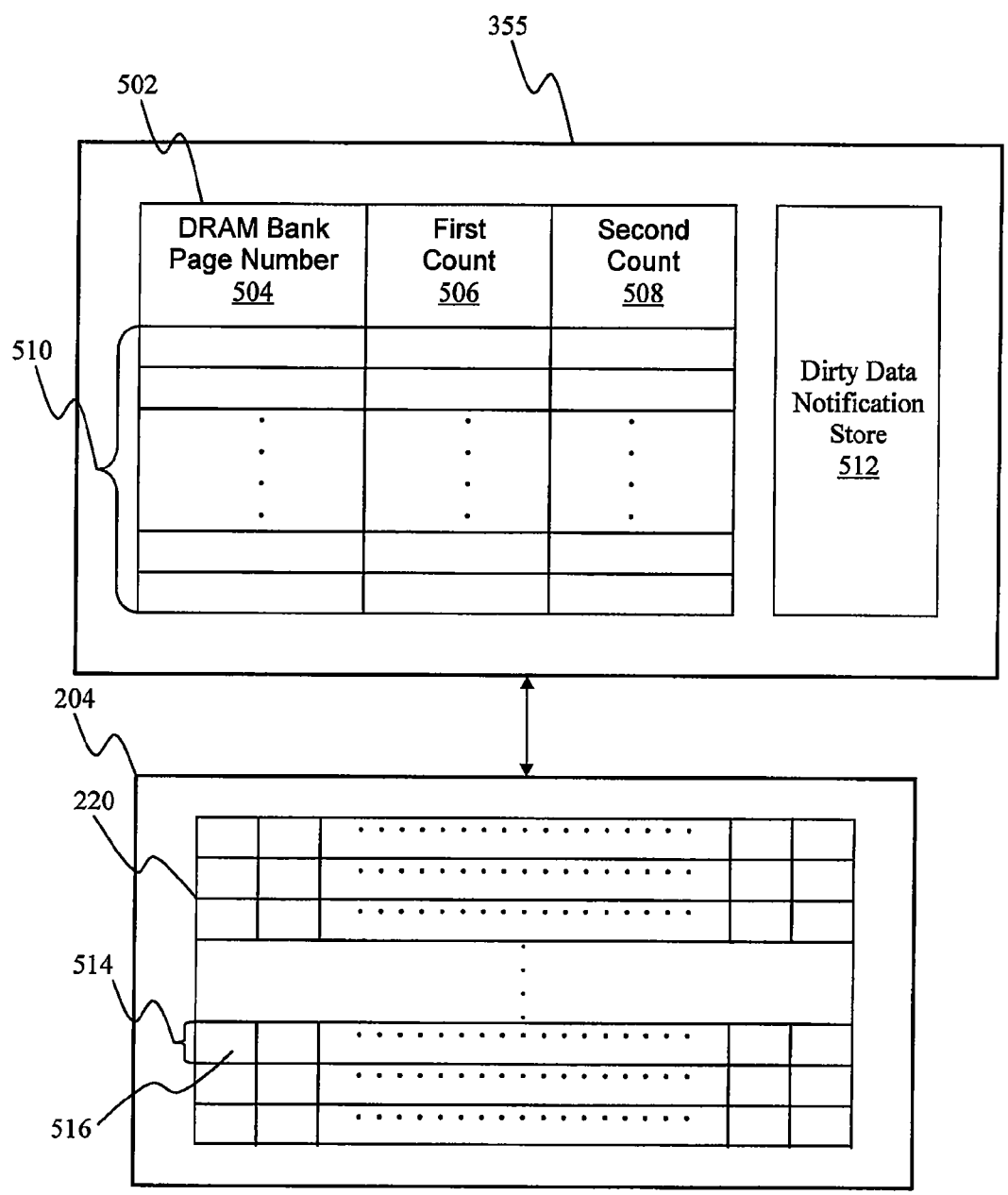
FIG. 5 is a detailed block diagram of the frame buffer logic of FIG. 4 and the DRAM of FIG. 2, according to one embodiment of the present invention.

FIG. 5 is a detailed block diagram of the frame buffer logic 355 of FIG. 4 and the DRAM 220 of FIG. 2, according to one embodiment of the present invention. As shown, the frame buffer logic 355 includes a notification sorter 502, and the DRAM 220 includes multiple bank pages, such as bank page 514, each of which includes several data blocks, such as data block 516. The frame buffer logic 355 is configured to transmit dirty data associated with a dirty data notification to a corresponding data block within a DRAM bank page within the DRAM 220.

As described in conjunction with FIG. 4, the tag look-up unit 410 transmits a dirty data notification to the frame buffer logic 355 each time dirty data is written to a cache line in the data cache 414. Again, the particular cache line in which dirty data is stored is determined by the tag look-up unit 410 using the memory address included in the write command associated with that dirty data. The memory address also reflects the particular data block within a DRAM bank page in the DRAM 220 where the dirty data should be stored. A dirty data notification, transmitted by the tag look-up unit 410, includes the memory address included in the write command associated with the dirty data and the data class of that dirty data. Using the notification sorter 502, the frame buffer logic 355 is configured to manage the dirty data notifications received by the tag look-up unit 410. The notification sorter 502 includes entries 510, where each such entry may be affirmatively associated with a different DRAM bank page. The number of entries 510 is determined based on the number of different DRAM bank pages in the DRAM 220.

As also shown, each of the entries 510 includes a DRAM bank page number 504, a first count 506 and a second count 508. For an entry that is affirmatively associated with a given DRAM bank page, the DRAM bank page number 504 of that entry reflects the actual bank page number of the given DRAM bank page. The first count 506 of that entry reflects the number of cache lines in the data cache 414 that have resident dirty data and are associated with the given DRAM bank page. The second count 508 of that entry reflects the number of cache lines in the data cache 414 that have resident dirty data belonging to the evict_first data class and are associated with the given DRAM bank page.

The frame buffer logic 355 is also configured to separately store the memory address included in each of the dirty data notifications in a dirty data notification store 512. Storing the memory addresses allows the frame buffer logic 355 to request the dirty data resident in the cache lines in the data cache 414 associated with those memory addresses for storage in the DRAM 220. In one embodiment, the DRAM 220 includes more than two-thousand DRAM bank pages, such as bank page 514. Each DRAM bank page includes thirty-two data blocks, such as data block 516, each of which comprises thirty-two bytes. The DRAM bank page and the exact data block within that DRAM bank page where the dirty data is stored is determined by the frame buffer logic 355 based on the memory address associated with the relevant dirty data notification.

More specifically, when the frame buffer logic 355 receives a dirty data notification from the tag look-up unit 410, the frame buffer logic 355 stores the memory address included in the dirty data notification in the dirty data notification store 512 in addition to the address of the data within the data cache 414. The frame buffer logic 355 also extracts the DRAM bank page number from the memory address included in the dirty data notification. The frame buffer logic 355 then attempts to match the extracted DRAM bank page number with the DRAM bank page number 504 of each of the affirmatively associated entries within the entries 510. If there is no match, then the frame buffer logic 355 affirmatively associates an available entry within the entries 510 with the DRAM bank page associated with the extracted DRAM bank page number by setting the DRAM bank page number 504 of that entry to the extracted DRAM bank page number. However, if there is a match, indicating that one of the entries 510 is already affirmatively associated with the DRAM bank page associated with the extracted DRAM bank page number, then the frame buffer logic 355 increments the first count 506 of the affirmatively associated entry. Further, if the data class of the dirty data associated with the dirty notification is the evict_first data class, then the frame buffer logic 355 also increments the second count 508 of the affirmatively associated entry.

When determining which dirty data to request from the data cache 414 for storage in the DRAM 220, the frame buffer logic 355 polls the notification sorter 502 to identify a set of entries within the entries 510 where the number of cache lines that have resident dirty data, reflected by the first count 506, is above a pre-determined threshold. The frame buffer logic 355 then compares the second count 508 associated with the different entries in the identified set of entries to determine which of the identified entries has the greatest number of cache lines having resident dirty data belonging to the evict_first data class. The frame buffer logic 355 selects the dirty data associated with this particular identified entry for storage in the DRAM 220. By selecting the entry with the greatest number of cache lines having resident dirty data belonging to the evict_first data class, the frame buffer logic 355 ensures that dirty data belonging to the evict_first data class (i.e., dirty data with a low reuse potential) is evicted with a higher priority than dirty data belonging to the evict_normal data class or the evict_last data class.

Once this determination and selection is made, the frame buffer logic 355 retrieves the stored memory addresses of the dirty data associated with the DRAM bank page number 504 of the selected entry from the dirty data notification store 512. Again, a portion of each memory address stored in the dirty data notification store 512 reflects the DRAM bank page number of a particular DRAM bank page in the DRAM 220. The frame buffer logic 355 selects each memory address in the dirty data notification store 512 that reflects the DRAM bank page number that matches the DRAM bank page number 504 of the selected entry. The frame buffer logic 355 then transmits one or more read commands to the data cache 414, where each such read command includes a memory address retrieved from the dirty data notification store 512 and associated with the DRAM bank page corresponding to the selected entry. The data cache 414 then processes the read commands and causes the dirty data associated with each read command to be transmitted from the relevant cache lines within the data cache 414 to the frame buffer logic 355 for storage in the DRAM 220. In addition, the tag store 412 is updated to indicate the line is no longer dirty. The cache lines are clean, and the data resident in those cache lines may be evicted to make room for the data associated with future read and write commands. Finally, to store the dirty data in the DRAM 220, the frame buffer logic 355 transmits the dirty data to the particular DRAM bank page associated with the DRAM bank page number 504 of the selected entry in the notification sorter 502.

Figure 6A:
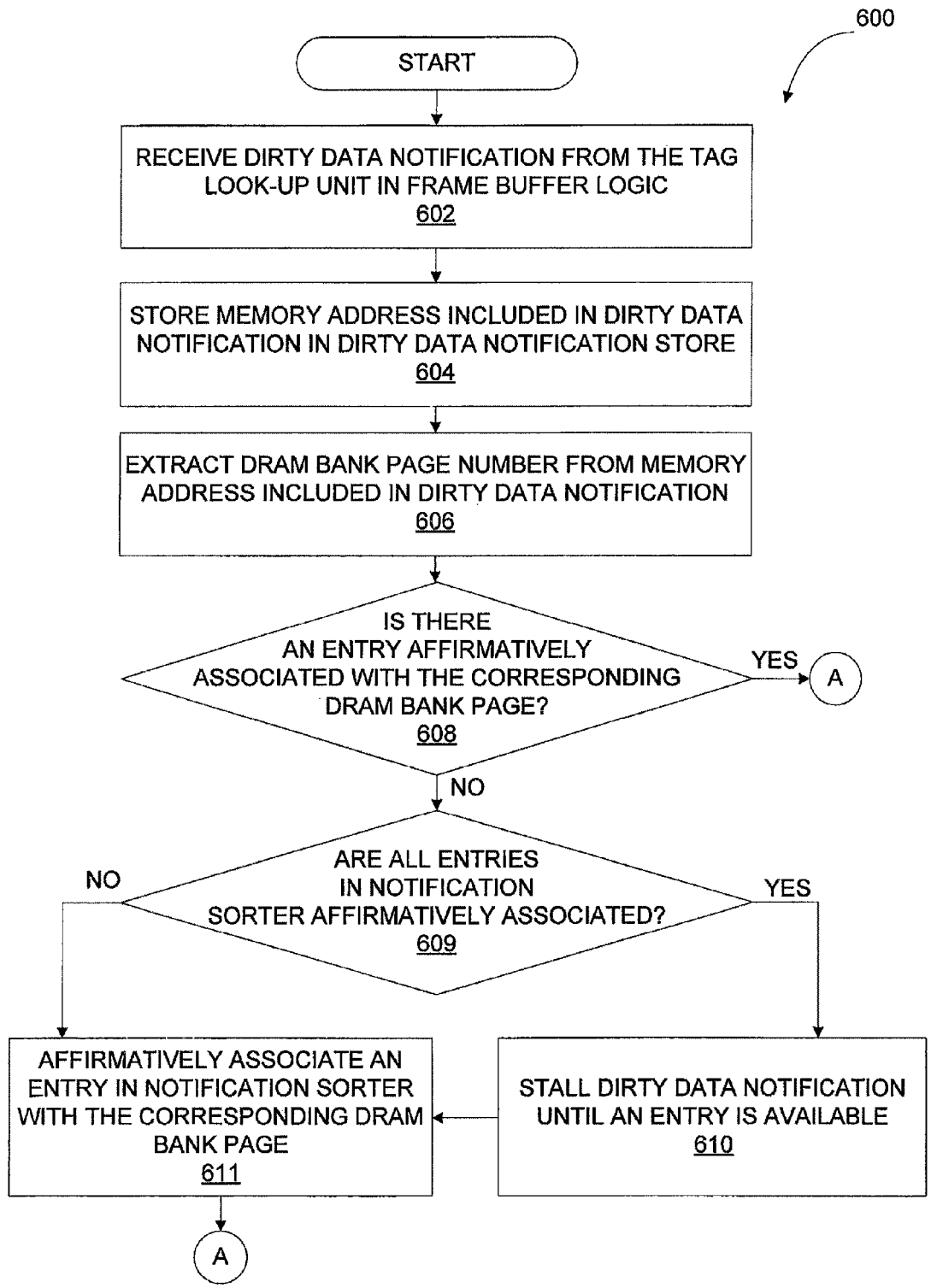
FIGS. 6A and 6B set forth a flow diagram of method steps for updating the notification sorter of FIG. 5 when a dirty data notification is received, according to one embodiment of the present invention.
Figure 6B:
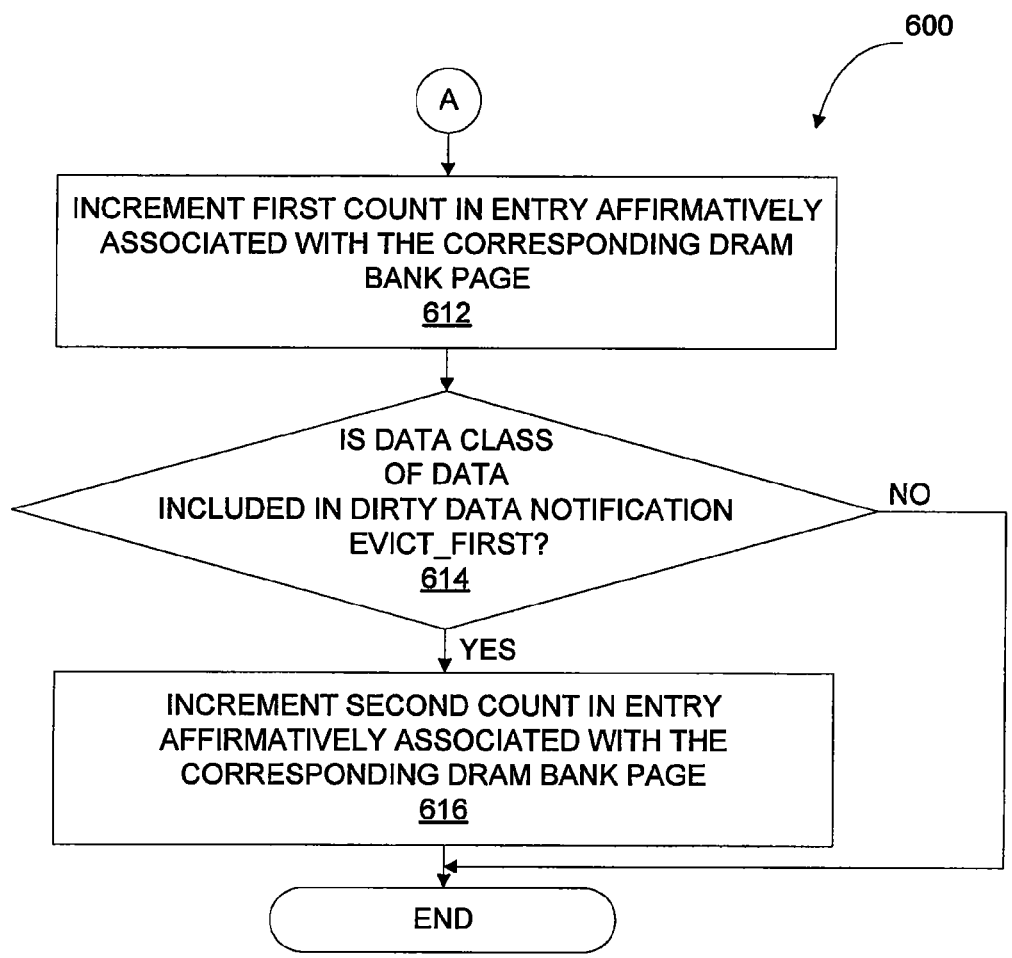

FIGS. 6A and 6B set forth a flow diagram of method steps for updating the notification sorter 502 of FIG. 5 when a dirty data notification is received, according to one embodiment of the present invention. Although the method steps are described in conjunction with the system of FIGS. 1-5, persons of ordinary skill in the art will understand that any system configured to perform the method steps, in any order, is within the scope of the invention.

The method 600 begins at step 602 where the frame buffer logic 355 receives a dirty data notification from the tag look-up unit 410. As described in conjunction with FIG. 4, when data is written to a cache line within the data cache 414, the tag look-up unit 410 transmits a dirty data notification to the frame buffer logic 355. The dirty data notification includes the memory address associated with a particular data block within a specific DRAM bank page in the DRAM 220 where the dirty data should be stored and the data class of the dirty data. The dirty data notification alerts the frame buffer logic 355 of the presence of dirty data resident in a particular cache line in the data cache 414 that needs to be transmitted to the DRAM 220 for storage. Again, the dirty data notification, via the memory address in that dirty data notification, associates dirty data stored in a particular cache line of the data cache 414 with a specific location within a DRAM bank page in the DRAM 220.

At step 604, the frame buffer logic 355 stores the memory address included in the dirty data notification in the in the dirty data notification store 512. As previously described, storing the memory address included in each dirty data notification allows the frame buffer logic 355 to request the dirty data associated with the stored memory address from the data cache 414 at a future clock cycle using the data cache address included in the dirty notification. At step 606, the frame buffer logic 355 analyzes the memory address included in the dirty data notification and extracts the DRAM bank page number identifying the DRAM bank page associated with that memory address.

At step 608, the frame buffer logic 355 attempts to match the extracted DRAM bank page number with the DRAM bank page numbers 504 of the entries in the notification sorter 502 to determine whether there is already an entry in the notification sorter 502 that is affirmatively associated with the DRAM bank page identified in step 606. If such an entry exists, then the method proceeds to step 612, as described below. If such an entry does not exist, then the method 600 proceeds to step 609, where the frame buffer logic 355 determines whether all the entries in the notification sorter 502 are affirmatively associated. If so, then the method proceeds to the step 610. At step 610, the dirty data notification is stalled until an entry in the notification sorter 502 is available to be affirmatively associated.

If, at step 609, all the entries in the notification 502 are not affirmatively associated, then the method proceeds to step 611. At step 611, the frame buffer logic 355 affirmatively associates a new entry with the identified DRAM bank page. The frame buffer logic 355 sets the DRAM bank page number 504 of the entry to reflect the extracted DRAM bank page number. At step 612, the frame buffer logic 355 increments the first count 506 in the entry associated with the identified DRAM bank page. As described in conjunction with FIG. 5, the first count 506 reflects the number of cache lines in the data cache 414 that are associated with the identified DRAM bank page and have resident dirty data.

At step 614, the frame buffer logic 355 determines whether the data class included in the dirty data notification is the evict_first data class. If the data class included in the dirty data notification is the evict_first data class, then at step 616, the frame buffer logic 355 increments the second count 508 in the entry associated with the identified DRAM bank page. The method 600 then terminates. If, at step 614, the data class included in the dirty data notification is not the evict_first data class, then the method 600 terminates without incrementing the second count 508.

Referring now back to step 608, if an entry that is affirmatively associated with the identified DRAM bank page already exists in the notification sorter 502, then the method 600 proceeds directly to step 612, previously described herein.

Figure 7A:
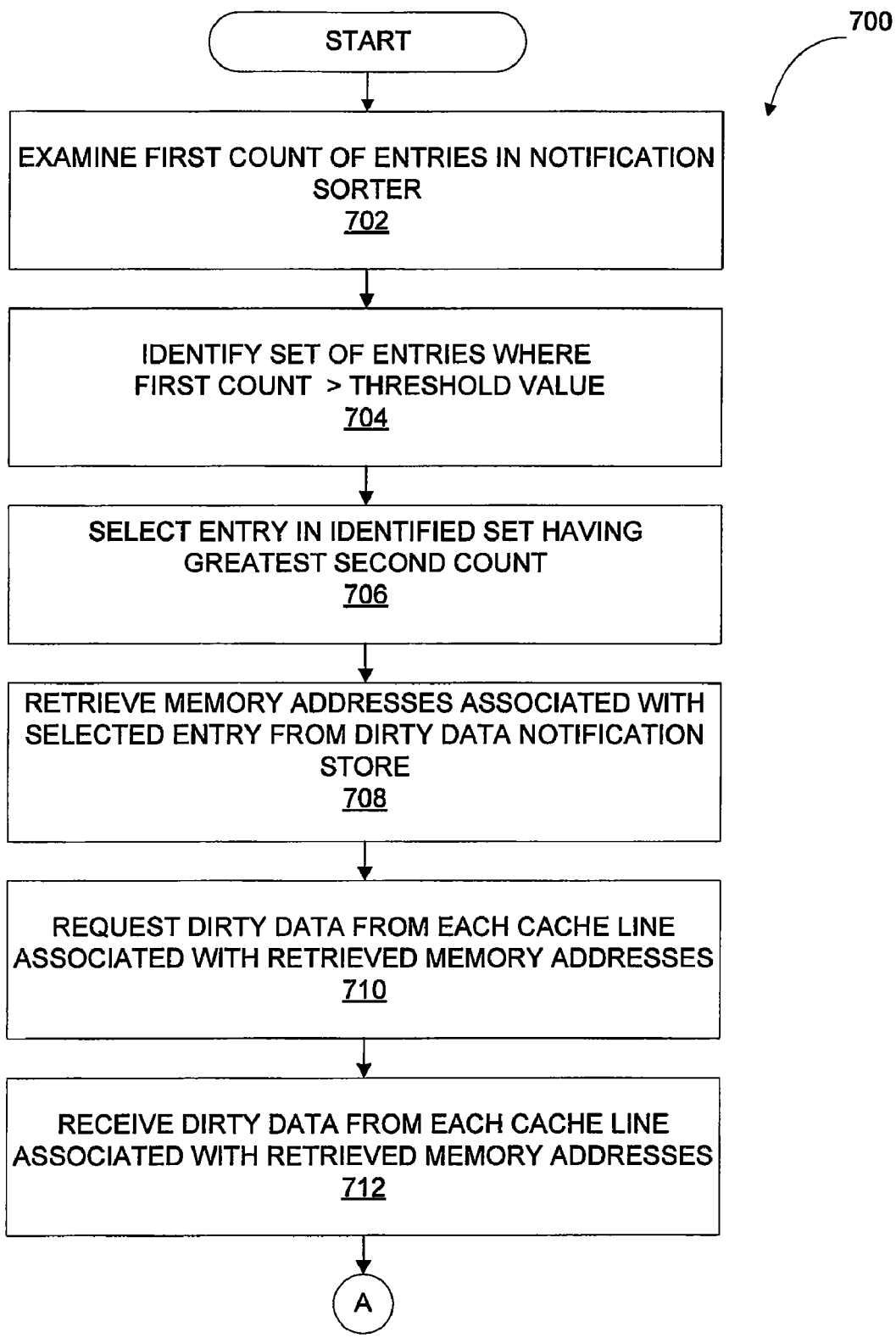
FIGS. 7A and 7B set forth a flow diagram of method steps for determining the dirty data that should be requested from the data cache for storage in the DRAM, according to one embodiment of the present invention
Figure 7B:
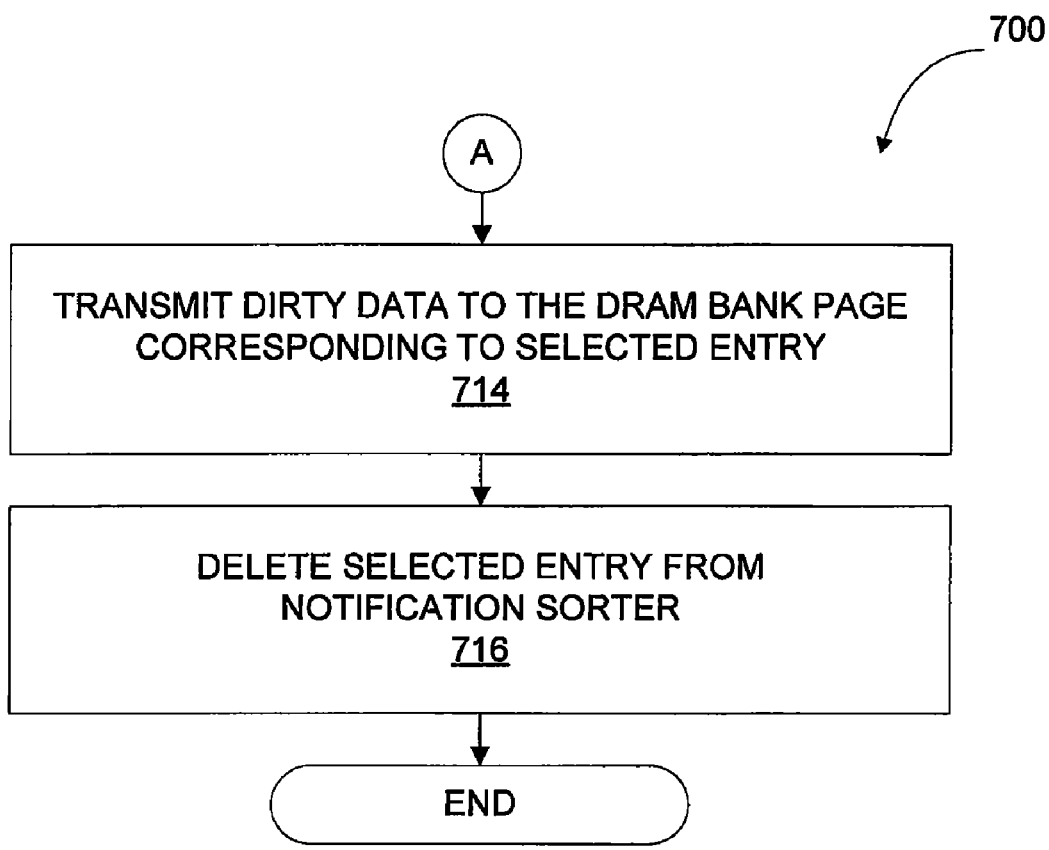

FIGS. 7A and 7B set forth a flow diagram of method steps for determining the dirty data that should be requested from the data cache 414 for storage in the DRAM 220, according to one embodiment of the present invention. Although the method steps are described in conjunction with the system of FIGS. 1-5, persons of ordinary skill in the art will understand that any system configured to perform the method steps, in any order, is within the scope of the invention.

The method 700 begins at step 702, where the frame buffer logic 355 examines the first count 506 of each affirmatively associated entry within the entries 510 in the notification sorter 502. At step 704, the frame buffer logic 355 identifies a set of associated entries in the notification sorter 502 where the first count 506 is greater than a pre-determined threshold value. As described in conjunction with FIG. 5, the first count 506 reflects the number of cache lines in the data cache 414 that are associated with a particular DRAM bank page and have resident dirty data.

At step 706, the frame buffer logic 355 compares the second count 508 of each entry in the identified set of entries and selects the entry with the greatest second count 508. As described in conjunction with FIG. 5, the second count 508 reflects the number of cache lines in the data cache 414 that are associated with a particular DRAM bank page and have resident dirty data that belongs to the evict_first data class. At step 708, the frame buffer logic 355 retrieves the memory addresses associated with the selected entry from the dirty data notification store 512. As described in conjunction with FIG. 5, a portion of each such memory address reflects the DRAM bank page number of a particular DRAM bank page in the DRAM 220. The frame buffer logic 355 selects each memory address in the dirty data notification store 512 that reflects the DRAM bank page number that matches the DRAM bank page number 504 of the entry selected at step 706.

At step 710, the frame buffer logic 355 transmits one or more read commands to the data cache 414 requesting the dirty data from the cache lines in the data cache 414 associated with the memory addresses retrieved from the notification store 512 at step 708. Again, the addresses of the various cache lines in the data cache 414 are derived from the memory address included in the read/write request received by the L2 slice 402. These memory addresses reflect locations within the DRAM 220 and are the same addresses included in the dirty data notifications and stored in the dirty data notification store 512. Further, a different read command is transmitted to the tag look-up unit 410 for each memory address selected at step 708. The tag look-up unit 410 processes the read commands and causes the dirty data resident in the cache lines in the data cache 414 associated with the memory addresses retrieved at step 708 to be transmitted to the frame buffer logic 355. At step 712, the frame buffer logic 355 receives the dirty data transmitted at step 710. At step 714, the frame buffer logic 355 transmits the received dirty data to the DRAM 220 for storage. Again, all of the dirty data requested, received and transmitted in steps 710-714 is associated with a specific DRAM bank page within the DRAM 220 (corresponding to the DRAM bank page number 504 of the entry selected at step 706. The frame buffer logic 355 thus transmits the dirty data to the specific-DRAM bank page for storage. At step 716, once the dirty data associated with the selected entry is transmitted to the DRAM 220, then the selected entry is deleted from the notification sorter 502 and the method 700 terminates.

In sum, the frame buffer logic processes dirty data notifications received from the tag look-up unit within the L2 cache slice and decides when to request the dirty data associated with those notifications for storage in the external memory.

Dirty data is categorized into data classes based on the reuse potential of the dirty data. For example, the evict_first data class reflects a low reuse potential of the dirty data. Each entry in a notification sorter is associated with a particular DRAM bank page and reflects the number of cache lines in the data cache of the L2 cache slice that have resident dirty data associated with a particular DRAM bank page. Each entry also reflects how many of those cache lines have resident data belonging to the evict_first data class.

The frame buffer logic updates the notification sorter every time a dirty data notification is received from the tag look-up unit. A dirty data notification received by the frame buffer logic 355 includes the memory address and the data class of the dirty data resident in a cache line in the data cache of the L2 cache slice. The frame buffer logic extracts the DRAM bank page number from the memory address and determines whether an entry for that DRAM bank page exists in the notification sorter. If an entry for that DRAM bank page does not exist, then the frame buffer logic creates an entry associated with that DRAM bank page. The frame buffer logic then increments a first count in the entry associated with the identified DRAM bank page, where the first count reflects the number of cache lines in the data cache that are associated with the identified DRAM bank page and have resident dirty data. If the data class included in the dirty notification is evict_first, then the frame buffer logic also increments a second count in the entry associated with the identified DRAM bank page, where the second count reflects how many of the cache lines that are associated with the identified DRAM bank page have resident dirty data belonging to the evict_first data class. The frame buffer logic continuously polls the notification sorter to determine the set of entries where the number of cache lines that have resident dirty data is above a pre-determined threshold. The frame buffer logic then examines this identified set of entries and selects the entry having the greatest second count, which indicates the DRAM bank page that is associated with the greatest number of cache lines having resident dirty data belonging to the evict_first data class. The frame buffer logic then requests the dirty data from the cache lines in the data cache associated with the selected entry. Once the dirty data is received from the data cache, the frame buffer logic transmits the dirty data to the external memory for storage.

Advantageously, selecting the entry that has the highest count of cache lines with dirty data and the highest count of cache lines with dirty data belonging to evict_first data class ensures that the cache lines with dirty data belonging to the evict_first data class will be cleaned at a higher priority than dirty data belonging to other data classes. Since dirty data belonging to the evict_first data class has a low reuse potential, evicting this dirty data at a higher priority reduces the number of cache misses, thereby improving the overall performance of the system.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for managing information related to dirty data stored in an intermediate cache coupled to one or more clients and to an external memory, the method comprising:
   receiving a dirty data notification related to dirty data residing in the intermediate cache, the dirty data notification including a memory address indicating a location in the external memory where the dirty data should be stored and a data type associated with the dirty data;
   extracting a bank page number from the memory address that identifies a bank page within the external memory where the dirty data should be stored;

incrementing a first count associated with a first entry in a notification sorter that is affirmatively associated with the bank page, wherein the first count indicates the number of cache lines in the intermediate cache that have resident dirty data and are associated with the bank page;

determining that the dirty data has a first data type; and incrementing a second count associated with the first entry, wherein the second count indicates the number of cache lines in the intermediate cache that have resident dirty data having the first data type and are associated with the bank page.

2. The method of claim 1, further comprising the steps of:

receiving a second dirty data notification including a second memory address;

extracting a second bank page number from the second memory address;

determining that no existing entries in the notification sorter are affirmatively associated with the second bank page; and affirmatively associating a second entry in the notification sorter with the second bank page.

3. The method of claim 1, wherein the first data type comprises an evict-first data type.

4. The method of claim 3, wherein the dirty data comprises raster operations data.

5. The method of claim 1, further comprising the step of storing the memory address included in the dirty data notification in a dirty data notification store.

6. The method of claim 5, further comprising the step of retrieving the memory address from the dirty data notification store in order to process the dirty data, wherein the location of the dirty data within the intermediate cache is derived from the memory address.

7. The method of claim 6, further comprising determining that the dirty data should be written to the external memory based on the first count and the second count.

8. A system coupled to one or more clients and to an external memory and configured to manage information related to resident dirty data, the system comprising:

an intermediate cache configured to store data related to memory access requests received from the one or more clients; and frame buffer logic coupled to the intermediate cache and including a notification sorter for storing information related to dirty data notifications received from the intermediate cache, the frame buffer logic configured to:

receive a first dirty data notification from the intermediate cache related to dirty data residing in the intermediate cache, the first dirty data notification including a memory address indicating a location in the external memory where the dirty data should be stored and a data type associated with the dirty data;

extract a bank page number from the memory address that identifies a bank page within the external memory where the dirty data should be stored;

increment a first count associated with a first entry in the notification sorter that is affirmatively associated with the bank page, wherein the first count indicates the number of cache lines in the intermediate cache that have resident dirty data and are associated with the bank page;

determine that the dirty data has a first data type; and increment a second count associated with the first entry, wherein the second count indicates the number of cache lines in the intermediate cache that have resident dirty data having the first data type and are associated with the bank page.

9. The system of claim 8, wherein the frame buffer logic is further configured to:

receive a second dirty data notification including a second memory address;

extract a second bank page number from the second memory address;

determine that no existing entries in the notification sorter are affirmatively associated with the second bank page; and affirmatively associate a second entry in the notification sorter with the second bank page.

10. The system of claim 8, wherein the first data type comprises an evict-first data type.

11. The system of claim 10, wherein the dirty data comprises raster operations data.

12. The system of claim 8, wherein the frame buffer logic is further configured to store the memory address included in the first dirty data notification in a dirty data notification store that is also included in the frame buffer logic.

13. The system of claim 12, wherein the frame buffer logic is further configured to retrieve the memory address stored in the dirty data notification store in order to process the dirty data and derive the location of the dirty data in the intermediate cache from the memory address.

14. The system of claim 13, wherein the frame buffer logic is further configured to determine that the dirty data should be written to the external memory based on the first count and the second count.

15. A computing device, comprising:

one or more clients;

an intermediate cache configured to store data related to memory access requests received from the one or more clients;

frame buffer logic coupled to the intermediate cache and to an external memory and including a notification sorter for storing information related to dirty data notifications received from the intermediate cache, the frame buffer logic configured to:

receive a first dirty data notification from the intermediate cache related to dirty data residing in the intermediate cache, the first dirty data notification including a memory address indicating a location in the external memory where the dirty data should be stored and a data type associated with the dirty data, extract a bank page number from the memory address that identifies a bank page within the external memory where the dirty data should be stored, increment a first count associated with a first entry in the notification sorter that is affirmatively associated with the bank page, wherein the first count indicates the number of cache lines in the intermediate cache that have resident dirty data and are associated with the bank page, determine that the dirty data has a first data type, and increment a second count associated with the first entry, wherein the second count indicates the number of cache lines in the intermediate cache that have resident dirty data having the first data type and are associated with the bank page; and a cross bar unit that couples the one or more clients to the intermediate cache.

16. The computing device of claim 15, wherein the frame buffer logic is further configured to:
- receive a second dirty data notification including a second memory address;
- extract a second bank page number from the second memory address;
- determine that no existing entries in the notification sorter are affirmatively associated with the second bank page; and
- affirmatively associate a second entry in the notification sorter with the second bank page.

17. The computing device of claim 15, wherein the first data type comprises an evict-first data type.

18. The computing device of claim 17, wherein the dirty data comprises raster operations data.

19. The computing device of claim 15, wherein the frame buffer logic is further configured to store the memory address included in the first dirty data notification in a dirty data notification store that is also included in the frame buffer logic.

20. The computing device of claim 19, wherein the frame buffer logic is further configured to retrieve the memory address stored in the dirty data notification store in order to process the dirty data and derive the location of the dirty data in the intermediate cache from the memory address.

21. The computing device of claim 20, wherein the frame buffer logic is further configured to determine that the dirty data should be written to the external memory based on the first count and the second count.

* * * * *